US011082491B2

(12) United States Patent
Shell et al.

(10) Patent No.: US 11,082,491 B2
(45) Date of Patent: Aug. 3, 2021

(54) PROPAGATING ORIGIN INFORMATION FOR APPLICATIONS DURING APPLICATION INSTALLATION

(71) Applicant: Microsoft Technology Licensing, LLC, Redmond, WA (US)

(72) Inventors: Scott R. Shell, Kirkland, WA (US); Kinshumann Kinshumann, Redmond, WA (US); Thomas W. Caldwell, Bellevue, WA (US); Jeffrey A. Sutherland, Seattle, WA (US); Jeffrey R. McKune, Sammamish, WA (US); Deskin M. Miller, Redmond, WA (US); Scott D. Anderson, Seattle, WA (US); Md. Nazmus Sakib, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 15/288,586

(22) Filed: Oct. 7, 2016

(65) Prior Publication Data
US 2018/0103097 A1 Apr. 12, 2018

(51) Int. Cl.
*H04L 12/70* (2013.01)
*H04L 29/08* (2006.01)
*H04L 29/06* (2006.01)

(52) U.S. Cl.
CPC ........ *H04L 67/1097* (2013.01); *H04L 63/126* (2013.01); *H04L 67/327* (2013.01); *H04L 67/34* (2013.01); *H04L 67/42* (2013.01)

(58) Field of Classification Search
CPC .... H04L 67/1097; H04L 67/327; H04L 67/42
(Continued)

(56) References Cited

U.S. PATENT DOCUMENTS 5,974,454 A * 10/1999 Apfel .................. G06F 8/65
709/218
6,854,016 B1 2/2005 Kraenzel et al.
(Continued)

FOREIGN PATENT DOCUMENTS

WO 2000062142 A2 10/2000
WO 2007026228 A2 3/2007
(Continued)

OTHER PUBLICATIONS

Grimes, Roger, "Authenticode", Retrieved on: Jun. 22, 2016 Avilable at: http://msdn.microsoft.com/en-us/library/cc750035.aspx.
(Continued)

*Primary Examiner* — Moustafa M Meky
*Assistant Examiner* — Elizabeth Kassa
(74) *Attorney, Agent, or Firm* — Fiala & Weaver P.L.L.C.

(57) ABSTRACT

An application is installed on a computing device from an application package. An origin of the application (e.g., a managed installer for an enterprise, a reputation checking service) is propagated to files written to a storage device of the computing device as part of the installation, such as by writing origin information to the storage device as metadata associated with the file. The origin information for a file, in conjunction with a policy on the computing device specifying one or more trusted origins for applications on the computing device, is used to identify whether a particular action can be taken with and/or by the file. These actions can include, for example, execution of an application from an executable file. If the origin information for a file indicates an origin that is a trusted origin specified by the policy, then the action can be performed.

20 Claims, 7 Drawing Sheets

(58) Field of Classification Search
USPC .......................................................... 709/212
See application file for complete search history.

(56) References Cited

U.S. PATENT DOCUMENTS

| | | | |
|---|---|---|---|
| 7,536,172 B2 | 5/2009 | Minear et al. | |
| 8,001,536 B2 | 8/2011 | Usov | |
| 9,268,545 B2 | 2/2016 | Lortz et al. | |
| 9,589,129 B2* | 3/2017 | Richardson | G06F 21/50 |
| 9,910,967 B2* | 3/2018 | Childress | G06F 21/105 |
| 2002/0069198 A1 | 6/2002 | Stebbings et al. | |
| 2002/0147923 A1 | 10/2002 | Dotan | |
| 2005/0086326 A1* | 4/2005 | Manning | G06F 21/10 |
| | | | 709/219 |
| 2005/0091192 A1 | 4/2005 | Probert et al. | |
| 2005/0149726 A1* | 7/2005 | Joshi | G06F 21/53 |
| | | | 713/164 |
| 2006/0265471 A1* | 11/2006 | Pitzel | G06F 8/61 |
| | | | 709/217 |
| 2008/0022263 A1* | 1/2008 | Bak | G06F 8/53 |
| | | | 717/136 |
| 2010/0057774 A1 | 3/2010 | Pizano et al. | |
| 2013/0067458 A1* | 3/2013 | Risney | G06F 9/44505 |
| | | | 717/175 |
| 2013/0347115 A1 | 12/2013 | Field | |
| 2014/0006598 A1* | 1/2014 | Uola | G06F 9/5077 |
| | | | 709/224 |
| 2014/0157355 A1* | 6/2014 | Clancy, III | G06F 21/53 |
| | | | 726/1 |
| 2015/0278487 A1* | 10/2015 | Scott | H04L 9/3239 |
| | | | 726/28 |
| 2016/0132310 A1* | 5/2016 | Koushik | G06F 8/61 |
| | | | 717/176 |
| 2016/0337382 A1* | 11/2016 | Thomas | G06F 21/56 |
| 2017/0346830 A1* | 11/2017 | Goldfarb | G06F 21/604 |

FOREIGN PATENT DOCUMENTS

| | | |
|---|---|---|
| WO | 2007073546 A2 | 6/2007 |
| WO | 2013079936 A1 | 6/2013 |

OTHER PUBLICATIONS

Georgiev, et al., "Breaking and Fixing Origin-Based Access Control in Hybrid Web/Mobile Application Frameworks", In Proceedings of 21st Annual Network and Distributed System Security Symposium, Feb. 23, 2014, pp. 1-15.

"AppLocker", Retrieved on: Jun. 28, 2016 Available at: https://technet.microsoft.com/en-us/library/dd723678(v=ws.10).aspx.

"Adjusting Process Token Privileges", Retrieved From: https://web.archive.org/web/20100531050106/https://winterdom.com/dev/security/tokens/, May 31, 2010, 6 pages.

"Understanding Process Tokens", Retrieved From: https://www.itprotoday.com/print/29163, Oct. 23, 2019, 5 pages.

* cited by examiner

PROPAGATING ORIGIN INFORMATION FOR APPLICATIONS DURING APPLICATION INSTALLATION

BACKGROUND

As computing technology has advanced, computing devices have become increasingly interconnected, exposing these devices to attacks from various malicious entities including other users, programs, devices, and so forth. Security systems have been developed to protect against these attacks, but given the wide variety of different types of attacks and sources of attacks, it remains difficult to protect computing devices against such attacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more embodiments, a request to install, using an application package, an application on a computing device is received. An origin of the application package is identified, the origin indicating a deployment source for the application package or a source of trust for the application package. The application is installed on the computing device, the installing including writing one or more files to a storage device of the computing device, and propagating an indication of the origin of the application package to each of the one or more files.

In accordance with one or more embodiments, a request to perform an action with regard to at least one file for an application installed on a computing device is received. A policy applied to the computing device is accessed, and a check made as to whether, based on the policy, an origin of the application is trusted for the computing device. In response to determining that the origin of the application is trusted for the computing device, the action is allowed to be performed. In response to determining that the origin of the application is not trusted for the computing device, the action is prevented from being performed on the computing device unless the policy otherwise indicates that the application can be performed on the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
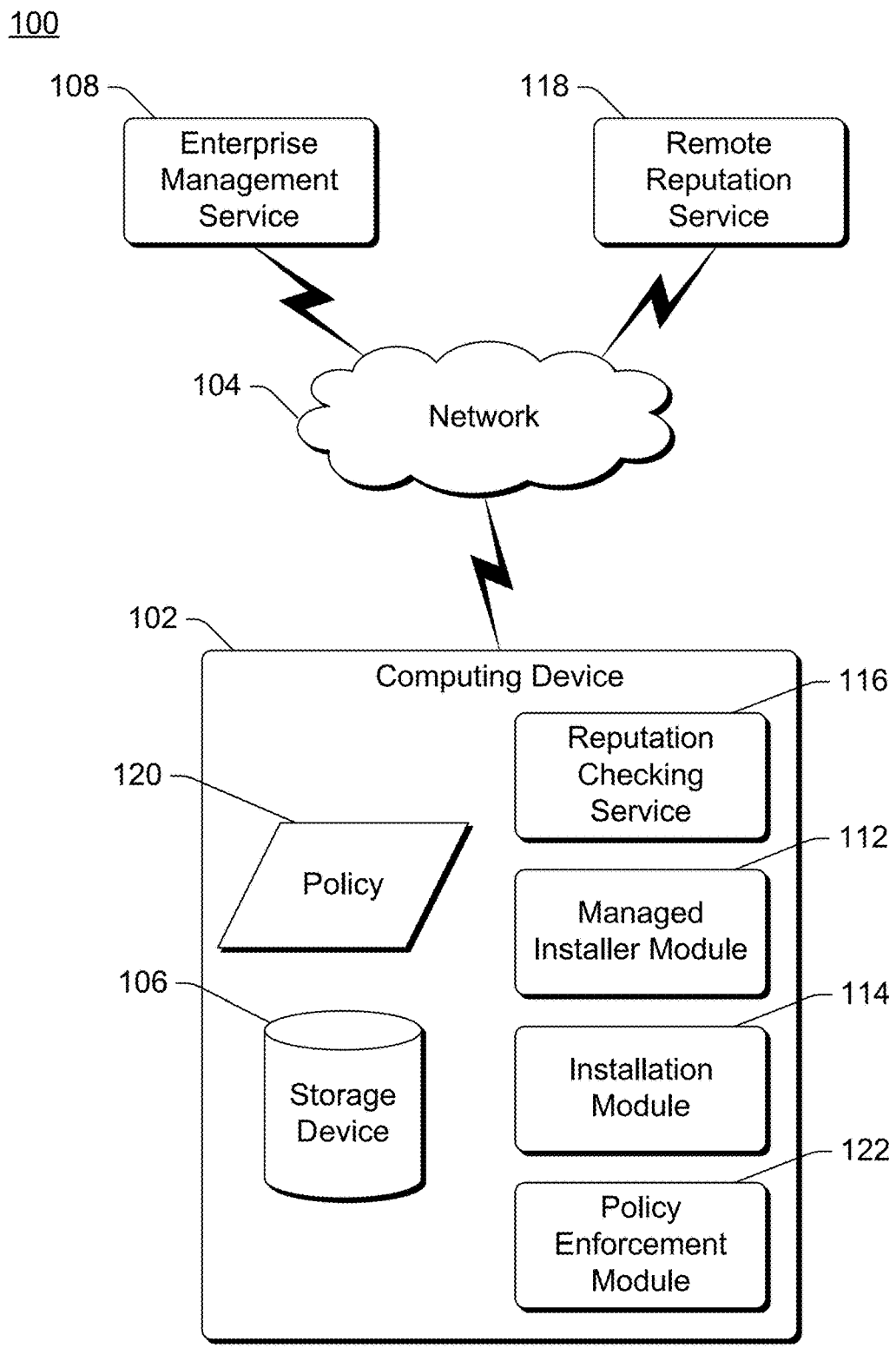
FIG. 1 illustrates an example system implementing the propagating origin information for applications during application installation in accordance with one or more embodiments.

Propagating origin information for applications during application installation is discussed herein. A policy is applied to a computing device, the policy indicating which applications can be run on the computing device. The policy can specify which applications can be run on the computing device in different manners, including a list of trusted origins for applications. If an application is from a trusted origin, then the application is allowed to run on the computing device. However, if the application is not from a trusted origin, then the application is not allowed to run on the computing device based on the origin of the application, although the policy may optionally include other rules that allow the application to run.

An application is installed on a computing device from an application package. The origin of the application package refers to a deployment source for the application package or the source of trust for that application package. The application is installed from the application package, so the origin of the application package is also referred to herein as the origin of the application. The deployment source can be a module or component that manages installation of the application, or a service that verifies the trustworthiness of the application. One example origin of the application package is a managed installer for an enterprise that the computing device is part of. The computing device is managed by an enterprise management service for the enterprise, and the enterprise management service includes a managed installer that manages installation of certain applications for the enterprise management service. The managed installer is the origin of application packages the installation of which is managed by that managed installer. One or more particular managed installers can be specified in the policy as being a trusted origin for the computing device. Another example origin of an application package is a reputation checking service that an installation program of an operating system uses to evaluate the application package. If the reputation service verifies that the application package (and thus the application installed therefrom) is trustworthy, then the application package (and the application installed therefrom) is deemed to be trustworthy. One or more reputation checking services can be specified in the policy as being a trusted origin for the computing device.

When an application package is installed on the computing device, origin information indicating the origin of the application is propagated to one or more files written to a storage device of the computing device as part of the application installation process. This origin information is propagated to each of the one or more files by, for example, writing the origin information as metadata associated with the file. This origin information for the one or more files, in conjunction with the indication of one or more trusted origins in the policy, can be used by the computing device to identify whether a particular action can be taken with and/or by the file. These actions can include, for example, execution of an application from an executable file, accessing of particular resources on the computing device and/or in a network, loading of a file, record keeping or logging regarding the file, and so forth.

For example, when an attempt is made to run an installed application from an executable file, the indication of the origin of the application is readily available as it is has been propagated to the executable file. A check is made as to whether the policy indicates that the origin of the application is a trusted origin on the computing device. If the policy indicates that the origin of the application is a trusted origin on the computing device, then the application is allowed to run on the computing device. However, if the policy indicates that the origin of the application is not a trusted origin on the computing device, then the application is not allowed to run on the computing device (unless the policy otherwise indicates that the application can be run on the computing device).

Using the techniques discussed herein, an enterprise administrator can specify which applications are allowed to run based on the origin of the applications. Thus, rather than having to specify each application individually, groups of applications can be specified based on their origin. The enterprise administrator need not update the policy on the computing device to positively recite an identifier for each new application that is installed on the computing device or each new version of an application that is installed on the computing device, but can rely on the fact that the managed installer for the enterprise authorizes the installation. This saves time on the part of the enterprise administrator, and improves security of the computing device by providing more robust security for determining which applications can be run on a computing device.

FIG. 1 illustrates an example system 100 implementing the propagating origin information for applications during application installation in accordance with one or more embodiments. The system 100 includes a computing device 102 that can be a variety of different types of devices. For example, the computing device 102 can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), augmented reality (AR) or virtual reality (VR) devices, an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 102 may range from a full resource device with substantial memory and processor resources (e.g., personal computers, game consoles) to a low resource device with limited memory and/or processing resources (e.g., traditional set-top boxes, hand-held game consoles).

In one or more embodiments, the computing device 102 obtains application packages via a network 104. The network 104 can be a variety of different networks, such as the Internet, a local area network (LAN), a phone network, an intranet, other public and/or proprietary networks, combinations thereof, and so forth. An application package refers to a collection of instructions and/or data used to install an application on the computing device 102. The application package can take various forms, such as an executable file, a combination of contents and information describing how to install the application, compressed and/or uncompressed instructions and/or data, and so forth. As part of installing an application package on the computing device 102, one or more files are written to a storage device 106 of the computing device 102. In one or more embodiments, these one or more files include an executable file that is executed by the computing device 102 to run the application. The storage device 106 can be any of a variety of different storage devices, such as solid state memory (e.g., a Flash memory drive), a magnetic disk, an optical disc, and so forth.

The computing device 102 can obtain application packages in a variety of different manners. In one or more embodiments, the computing device 102 is part of an enterprise, which is a collection of computing devices managed as part of an organization, such as a business, educational facility, and so forth. In such embodiments, the computing device 102 is managed by an enterprise management service 108, which communicates with the computing device 102 via the network 104. The enterprise management service 108 can provide various security controls, applications for execution, and so forth to the computing device 102. In such embodiments, the computing device 102 can obtain application packages from the enterprise management service 108. The enterprise management service 108 can, similar to the discussion of computing device 102, be implemented by one or more of a variety of different devices, ranging from full resource devices with substantial memory and processor resources to low resource devices with limited memory and/or processing resources.

Additionally or alternatively, the computing device 102 can obtained application packages from other sources, such as application stores or other locations via the Internet (e.g., various different Web sites). The computing device 102 can also obtain application packages via mechanisms that do not leverage the network 104, such as via a removable thumb drive coupled to the computing device 102, via an optical disc inserted into the computing device 102, and so forth.

The computing device 102 includes a managed installer module 112 and an installation module 114. The managed installer module 112 installs application packages on behalf of the enterprise management service 108. The enterprise management service 108 notifies the managed installer module 112 of one or more application packages to install, and the managed installer module 112 manages the installation of those one or more application packages. Managing installation of an application package can be performed in different manners. In one or more embodiments, the application package is an executable file, and the managed installer module 112 initiates execution of the application package on the computing device 102. The application package, as it executes, performs the appropriate operations to install the application. Alternatively, the application package includes a combination of contents and information describing how to use the contents to install the application. In such embodiments, the managed installer module 112 accesses the information and performs the appropriate operations to install the application based on the information included in the application package.

In situations in which the managed installer module 112 manages installation of the application package, the origin of the application is the managed installer module 112. Additionally, in such situations the indication of the origin of the application is an indication or identifier of the managed installer module 112.

The installation module 114 manages installation of application packages received from sources other than the enterprise management service 108. These sources can be other computing devices, removable storage devices (e.g., thumb drives or optical discs), Web sites, and so forth. Similar to the managed installer module 112, the installation module 114 can manage installation of an application package by initiating execution of an executable application package file, or by accessing the information in the application package and performing the appropriate operations to install the application based on the information included in the application package.

The installation module 114 also accesses a reputation checking service 116 of the computing device 102 to obtain a reputation of an application package being installed. The reputation checking service 116 analyzes the application package and determines how trustworthy the application package is. The reputation checking module 116 optionally accesses a remote reputation service 118 via the network 104 to determine how trustworthy the application package is. The remote reputation service 118 can, similar to the discussion of computing device 102, be implemented by one or more of a variety of different devices, ranging from full resource devices with substantial memory and processor resources to low resource devices with limited memory and/or processing resources.

In one or more embodiments, the trustworthiness of the application package, and thus of the application installed from the application package, is an indication of how likely the application and/or application package is deemed to be malware. The trustworthiness of the application package can be generated by applying any of a variety of public and/or proprietary techniques to determine whether (or a likelihood) that the application and/or application package is malware. If the application package is determined to not be malware (or has at least a threshold probability of not being malware, such as 90% certain the application package is not malware), then the application packages is determined to be trustworthy. However, if the application package is determined to be malware (or has at least a threshold probability of being malware, such as 70% certain the application package is malware), then the application packages is determined to not be trustworthy. The reputation checking service 116 provides an indication of the trustworthiness of the application package. In one or more embodiments, this indication is either that the reputation checking service 116 verifies the application package is trustworthy or does not verify the application package is trustworthy.

In situations in which the installation module 114 manages installation of the application package, the origin of the application is the reputation checking service 116. Additionally, in such situations the indication of the origin of the application is an indication or identifier of the reputation checking service 116 verified the trustworthiness of the application package.

The computing device 102 also includes a policy 120. The policy 120 is a description of various actions that are permitted to be performed by the computing device 102. The policy 120 includes a list of one or more trusted origins for the computing device 102. Various actions can be taken by the computing device 102 for applications that are associated with a trusted origin, as discussed in more detail below. The policy 120 optionally includes additional information describing additional actions that can or cannot be performed by the computing device 102, such as identifiers of individual applications (e.g., application unique identifiers, such as hash values generated by applying a cryptographic hash function to an executable file for the application) that can or cannot be run on the computing device 102. The policy 120 is typically provided to the computing device 102 by the enterprise management service 108, although additionally or alternatively the policy 120 can be provided to the computing device 102 from other services or sources.

When an application is installed on the computing device 102, regardless of whether installation is managed by the managed installer module 112 or the installation module 114, one or more files for the application are written to the storage device 106. Origin information for the application (also referred to as an indication of the origin of the application), such as an identifier of the managed installer module 112 or the reputation checking service 116, is propagated to at least one of these files for the application. The origin information for the application can be propagated to all of the files for the application that are written to the storage device 106, or alternatively the indication of the origin of the application can be propagated to a subset of the files for the application that are written to the storage device 106 (e.g., to the executable files for the application).

Propagating origin information for the application refers to storing an indication of the origin of the application on the storage device 106 as associated with at least one of the one or more files written to the storage device 106 as part of installing the application on the computing device 102. In one or more embodiments, the origin information is stored as metadata associated with one or more of the files written to the storage device 106 as part of installing the application on the computing device 102.

Figure 2:
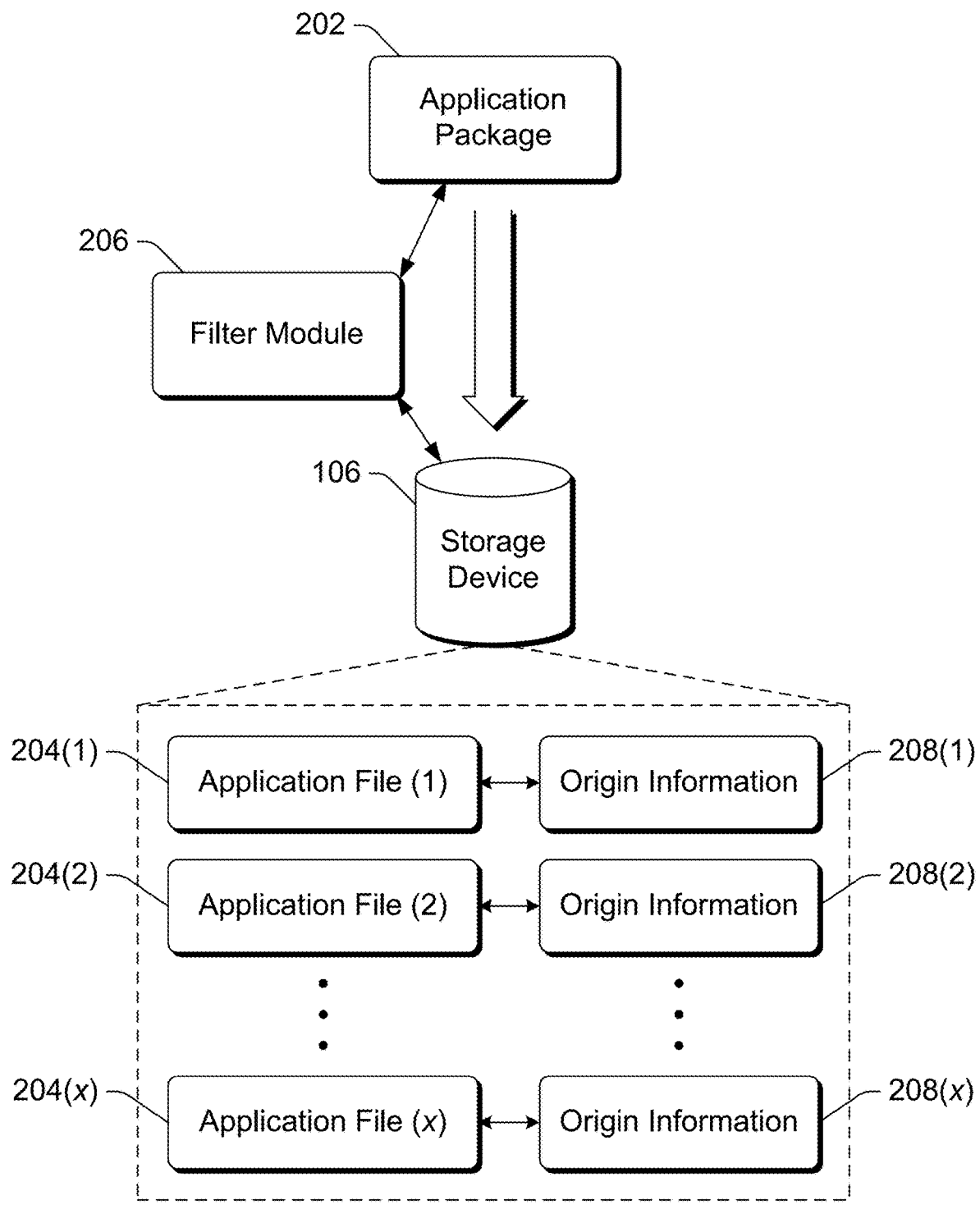
FIG. 2 illustrates an example of propagating origin information for an application in accordance with one or more embodiments.

FIG. 2 illustrates an example of propagating origin information for an application in accordance with one or more embodiments. As shown in FIG. 2, an application package 202 is installed on a computing device. As part of the installation process, one or more (x) files 204(1), . . . , 204(x) are written to the storage device 106 by the application package 202 invoking a filter module 206. The filter module 206 is, for example, a module of an operating system running on the computing device 102. The filter module 206 manages writing of data to the storage device 106 and reading of data from the storage device 106 for various executable files on the computing device. For each application file 204 written to the storage device 106, the filter module 206 writes to the storage device 106 origin information for the application package 202 as metadata associated with the application file 204. This metadata is illustrated as metadata 208(1), . . . , 208(x) in FIG. 2. The metadata 208 can be maintained in a variety of different manners. In one or more embodiments, for computing devices running certain of the Windows® family of operating systems, the metadata 208 is written as extended attributes in an Alternate Data Stream (ADS).

It should be noted that although origin information is illustrated as being written to the storage device 106 as metadata for each of the application files 204 written to the storage device, as discussed above in some situations origin information for an application file is not written to the storage device 106. For example, if an application file 204 is a data file and is not an executable file, origin information for that application file 204 may not be written to the storage device 106.

Figure 3:
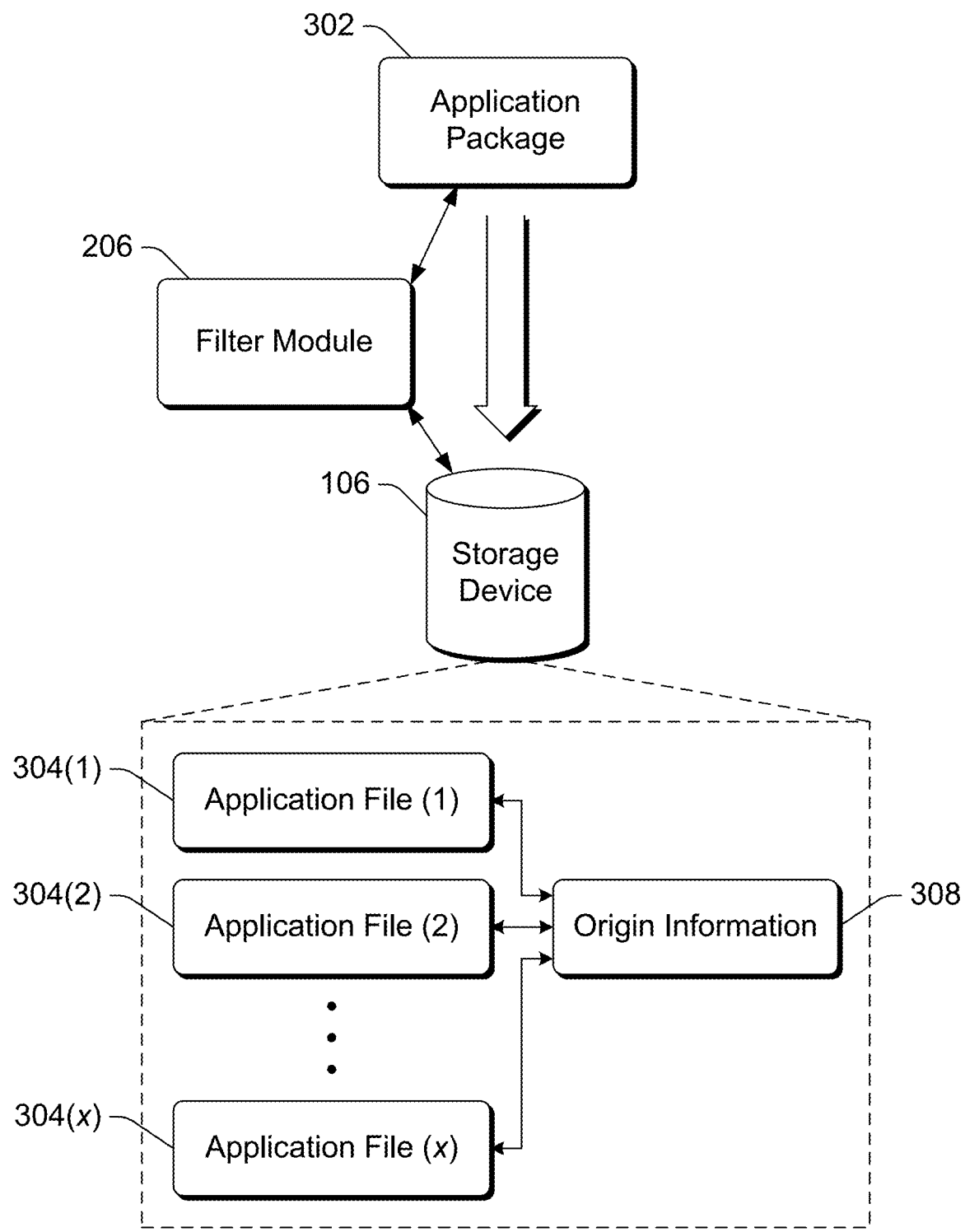
FIG. 3 illustrates another example of propagating origin information for an application in accordance with one or more embodiments.

FIG. 3 illustrates an example of propagating origin information for an application in accordance with one or more embodiments. As shown in FIG. 3, an application package 302 is installed on a computing device. As part of the installation process, one or more (x) files 304(1), ..., 304(x) are written to the storage device 106 by the application package 302 invoking a filter module 206. For each application file 304 written to the storage device 106, the filter module 206 writes to the storage device 106 origin information for the application package 302 as metadata associated with the application file 304. This metadata is illustrated as metadata 308. The example of FIG. 3 differs from the example of FIG. 2 in that a single copy of the origin information is stored for multiple application files 304 of the application package 302 (e.g., all the application files of the application package 302) rather than storing separate origin information for each application file 304. The metadata 308 can be stored, for example, a file, a database entry or other record, and so forth.

Returning to FIG. 1, the computing device 102 also includes a policy enforcement module 122. The policy enforcement module 122 can take various different types of actions based on the origin information associated with the application files on storage device 106 as well as the policy 120.

One such type of action is application execution decisions. In one or more embodiments, the policy enforcement module 122 checks, each time an application is to be run on the computing device 102, whether the policy 120 allows the application to be run. The policy enforcement module 122 checks the origin information for the application, and determines that the policy 120 allows an application to be run on the computing device if the policy specifies that an origin of the application (as indicated by the origin information for the application) is a trusted origin. If the origin of the application is a trusted origin, then the policy enforcement module 122 allows the application to run on the computing device 102. However, if the origin of the application is not a trusted origin, then the policy enforcement module 122 prevents the application from running on the computing device 102 unless the policy 120 otherwise indicates that the application can be run on the computing device 102. The policy 120 can otherwise indicate that the application can run on the computing device 102 in various manners, such as by including an identifier of the application (e.g., a hash value generated by applying a cryptographic hash function to an executable file of the application).

Another such type of action is resource access decisions. In one or more embodiments, the policy enforcement module 122 checks, each time an application running on the computing device 102 is to access a resource, whether the policy 120 allows the application to access the resource. Such a resource can be software, firmware, and/or hardware of the computing device 102, can be a remote computing device or service (e.g., accessed via the network 104), and so forth. The policy enforcement module 122 checks the origin information for the application, and determines that the policy 120 allows the application to access the resource if the policy specifies that an origin of the application (as indicated by the origin information for the application) is a trusted origin. If the origin of the application is a trusted origin, then the policy enforcement module 122 allows the application to access the resource. However, if the origin of the application is not a trusted origin, then the policy enforcement module 122 prevents the application from accessing the resource unless the policy 120 otherwise indicates that the application running on the computing device 102 can access the resource. The policy 120 can otherwise indicate that the application can access the resource in various manners, such as by including an identifier of the application (e.g., a hash value generated by applying a cryptographic hash function to an executable file of the application).

Another such type of action is loading decisions. In one or more embodiments, the policy enforcement module 122 checks, each time a file is to be read from the storage device 106, whether the policy 120 allows the file to be read (also referred to as loaded). The policy enforcement module 122 checks the origin information for the application associated with the file, and determines that the policy 120 allows the file to be read if the policy specifies that an origin of the application (as indicated by the origin information for the application and associated with the file) is a trusted origin. If the origin of the application is a trusted origin, then the policy enforcement module 122 allows the file to be read from the storage device 106 and loaded into memory on the computing device 102. However, if the origin of the application is not a trusted origin, then the policy enforcement module 122 prevents the application from reading and loading into memory the file on the computing device 102 unless the policy 120 otherwise indicates that the file can be read on the computing device 102. The policy 120 can otherwise indicate that the file can be read on the computing device 102 in various manners, such as by including an identifier of the application (e.g., a hash value generated by applying a cryptographic hash function to an executable file of the application).

Another such type of action is information logging decisions. In one or more embodiments, the policy enforcement module 122 checks, each time an application is run on the computing device 102, whether the policy 120 indicates to perform logging or other recording of the running of the application. The policy enforcement module 122 checks the origin information for the application, and determines that the policy 120 indicates to record that the application was run (e.g., and optionally a timestamp of when the application was run and/or a duration of the running of the application) if the policy specifies that an origin of the application (as indicated by the origin information for the application) is not a trusted origin. If the origin of the application is not a trusted origin, then the policy enforcement module 122 maintains (e.g., writes to the storage device 106) a record that the application was run on the computing device 102. However, if the origin of the application is a trusted origin, then the policy enforcement module 122 does not record running of the application on the computing device 102 unless the policy 120 otherwise indicates that running of the application on the computing device 102 is to be recorded. The policy 120 can otherwise indicate that running of the application is to be recorded in various manners, such as by including an identifier of the application (e.g., a hash value generated by applying a cryptographic hash function to an executable file of the application).

The techniques discussed herein can support taking one type of action based on the origin information associated with the application files on storage device 106 as well as the policy 120, or alternatively multiple different types of actions. In situations when multiple different types of actions are supported, the policy 120 can specify the same trusted origin for multiple different types of actions or alternatively the policy 120 can specify different trusted origins for different types of actions. For example, the policy 120 can specify one trusted origin for application execution decisions and another trusted origin for resource access decisions.

In one or more embodiments, running of an application on the computing device 102 includes creating one or more processes from at least one executable file of the application. Each process has an associated process token that includes various data, oftentimes referred to as claims, regarding the process, such as information regarding permissions the process has. In one or more embodiments, the origin information for the application is included as part of the information in the process token for an application.

Figure 4:
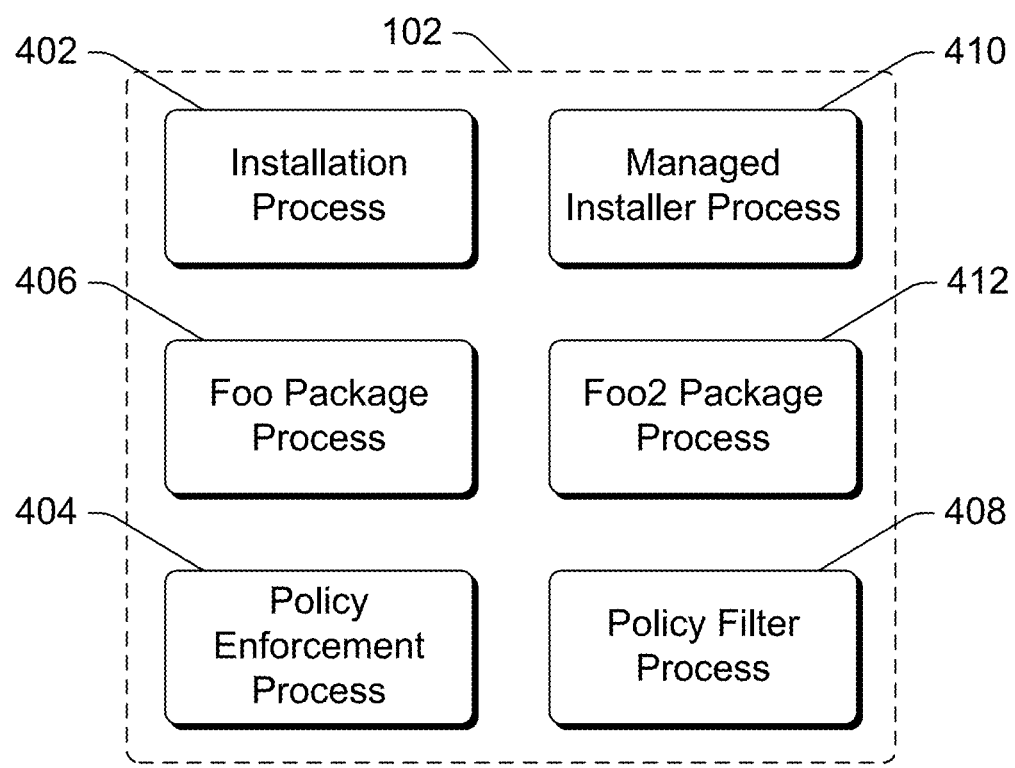
FIG. 4 illustrates an example of the use of origin information with processes in a computing device in accordance with one or more embodiments.

FIG. 4 illustrates an example of the use of origin information with processes in a computing device in accordance with one or more embodiments. The example of FIG. 4 is discussed with additional reference to elements of FIG. 1. Installation of application packages can be managed by the managed installer module 112 or the installation module 114 as discussed above.

For application packages the installation of which is managed by the installation module 114, when the installation module 114 is to begin running an installation process 402 is created that is an instance of the installation module 114. A policy enforcement process 404, which is an instance of the policy enforcement module 122, is also created. The policy enforcement process 404 can be created in response to creation of the installation process 402 or alternatively can already have been created on the computing device 102. When a request is made (e.g., a user request) to install an application named "foo" on the computing device 102 via the installation process 402, the installation process 402 determines whether a reputation service verifies the application package for the application "foo" as trustworthy. The determination can be made by the installation process 402, or the installation process 402 can initiate running of one or more additional programs on the computing device 402 to obtain the determination, can access a remote service, and so forth as discussed above to determine whether a reputation service verifies the application package for the application "foo" as trustworthy.

A reputation value indicating a reputation service that authorizes running of the application "foo" is provided to the policy enforcement process 404. The reputation value can be a value identifying the reputation service that verified the application package for the application "foo" as trustworthy (or simply a value indicating that a reputation service verifies the application package for the application "foo" as trustworthy regardless of which reputation service did so), or a value indicating that the application package for the application "foo" was not verified as trustworthy (or simply a value indicating that a reputation service does not verify the application package for the application "foo" as trustworthy regardless of which reputation service did so). The installation process 402 begins running the application package for "foo". A foo package process 406 is created, which is an instance of the application package for "foo". The policy enforcement process 404 includes an origin information claim in the process token of the foo package process 406 that identifies the reputation value for the application "foo" as the origin of the application package on the computing device 102. The claims of any additional processes created by the foo package process 406 will include the same claims as the process token of the foo package process 406. Accordingly, any additional processes created by the foo package process 406 will include the origin information claim that identifies the reputation value for the application "foo".

The foo package process 406 creates and writes one or more files to the storage device 106 by accessing a policy filter process 408. The policy filter process 408 receives the information to be written to the one or more files, and writes that received information to the storage device 106 as requested by the foo package process 406. Additionally, for at least one of the files written by the foo package process 406, the policy filter process 408 writes to the storage device 106 metadata identifying the origin information for the application "foo". The policy filter process 408 uses, as the origin information, the reputation value in the origin information claim of the foo package process 406. The policy filter process 408 can write the origin information for the application "foo" as metadata for all files created by the foo package process 406, or only a subset of the files created by the foo package process 406 as discussed above.

For application packages the installation of which is managed by the managed installer module 112, when the managed installer module is to begin 112 running, a managed installer process 410 is created that is an instance of the managed installer module 112. The policy enforcement process 404 is also created—the policy enforcement process 404 can be created in response to creation of the policy enforcement process 404 or alternatively can already have been created on the computing device 102. The policy enforcement process 404 includes an origin information claim in the process token of the managed installer process 410 that identifies the managed installer module 112 itself as the origin of the managed installer module on the computing device 102. The claims of any additional processes created by the managed installer process 410 will include the same claims as the process token of the managed installer process 410. Accordingly, any additional processes created by the managed installer process 410 will include the origin information claim that identifies the managed installer 112 as the origin of the process.

When a request is made (e.g., a user request or a request received from the enterprise management service 108) to install an application named "foo2" on the computing device 102 via the managed installer process 410, the managed installer process 410 begins running the application package for "foo2". A foo2 package process 412 is created, which is an instance of the application package for "foo2". The policy enforcement process 404 includes an origin information claim in the process token of the foo2 package process 412 that identifies the managed installer module 112 as the origin of the "foo2" application package on the computing device 102. The claims of any additional processes created by the foo2 package process 412 will include the same claims as the process token of the foo2 package process 412. Accordingly, any additional processes created by the foo2 package process 412 will include the origin information claim that identifies the origin information for the application "foo2".

The foo2 package process 412 creates and writes one or more files to the storage device 106 by accessing the policy filter process 408. The policy filter process 408 receives the information to be written to the one or more files, and writes that received information to the storage device 106 as requested by the foo2 package process 412. Additionally, for at least one of the files written by the foo2 package process 412, the policy filter process 408 writes to the storage device 106 metadata identifying the origin information for the application "foo". The policy filter process 408 uses, as the origin information, the indication of the managed installer module 112 in the origin information claim of the foo2 package process 412. The policy filter process 408 can write the origin information for the application "foo2" as metadata for all files created by the foo2 package process 412, or only a subset of the files created by the foo2 package process 412 as discussed above.

It should be noted that in the example of FIG. 2, installation for one application package is managed by the managed installer module 112 and installation for another application package is managed by the installation module 114. Alternatively, a computing device 102 may have application packages installed thereon that are managed only by the managed installer module 112 or by the installation module 114.

Figure 5:
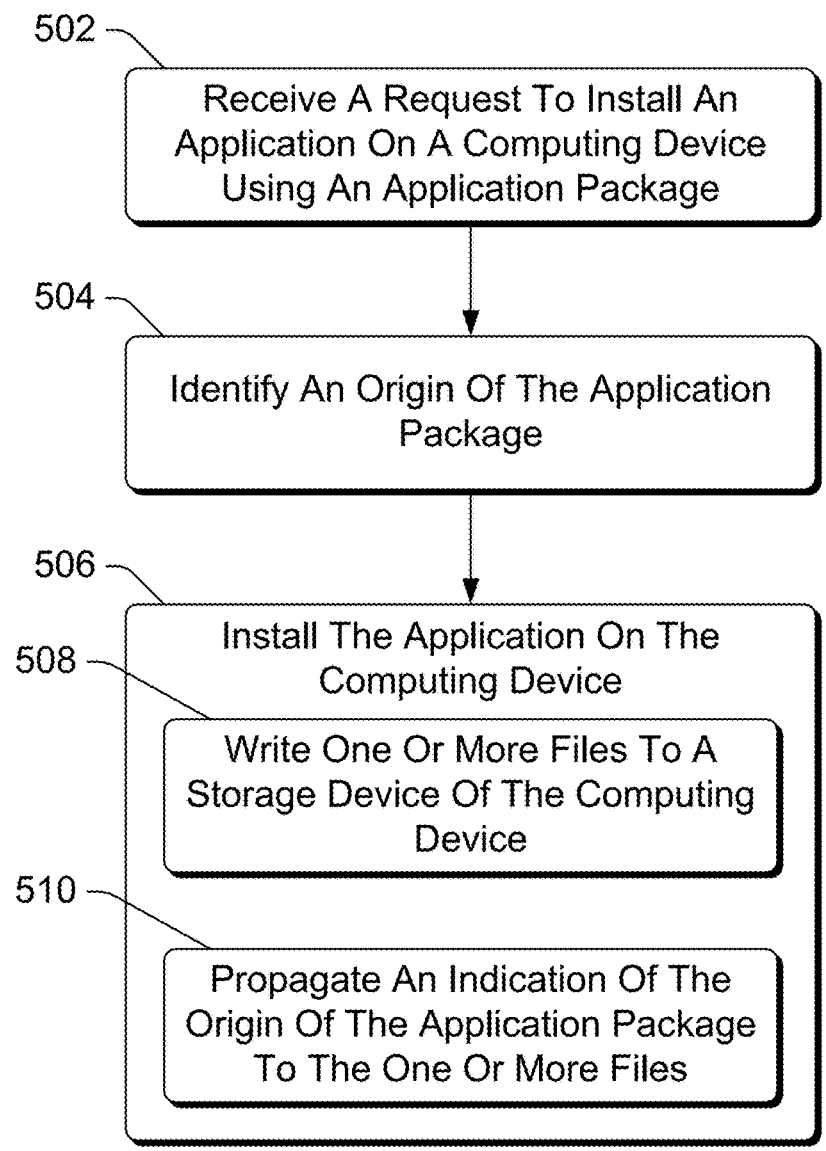
FIG. 5 is a flowchart illustrating an example process for implementing the propagating origin information for applications during application installation in accordance with one or more embodiments.

FIG. 5 is a flowchart illustrating an example process 500 for implementing the propagating origin information for applications during application installation in accordance with one or more embodiments. Process 500 is carried out by a computing device, such as computing device 102 of FIG. 1, and can be implemented in software, firmware, hardware, or combinations thereof. Process 500 is shown as a set of acts and is not limited to the order shown for performing the operations of the various acts. Process 500 is an example process for implementing the propagating origin information for applications during application installation; additional discussions of implementing the propagating origin information for applications during application installation are included herein with reference to different figures.

In process 500, a request to install an application on a computing device using an application package is received (act 502). The request can take various forms, such as a user input, a request or command from an enterprise management service, a request or command from an enterprise or computing device administrator, and so forth.

In response to the request, an origin of the application package is identified (act 504). The origin of the application package is also the origin of the application installed from the application package. The origin of the application package is a deployment source for the application or a source of trust for the application package, which can be, for example, a managed installer or a reputation service that authorizes the application package as being trustworthy as discussed above.

The application is installed on the computing device (act 506). Installing the application on the computing device includes writing, based on the application package, one or more files to a storage device of the computing device (act 508). Installing the application on the computing device also includes propagating an indication of the origin of the application package to the one or more files (act 510). Propagating the indication of the origin of the application package to the one or more files can be, for example, writing metadata associated with the one or more files to the storage device as discussed above.

Figure 6:
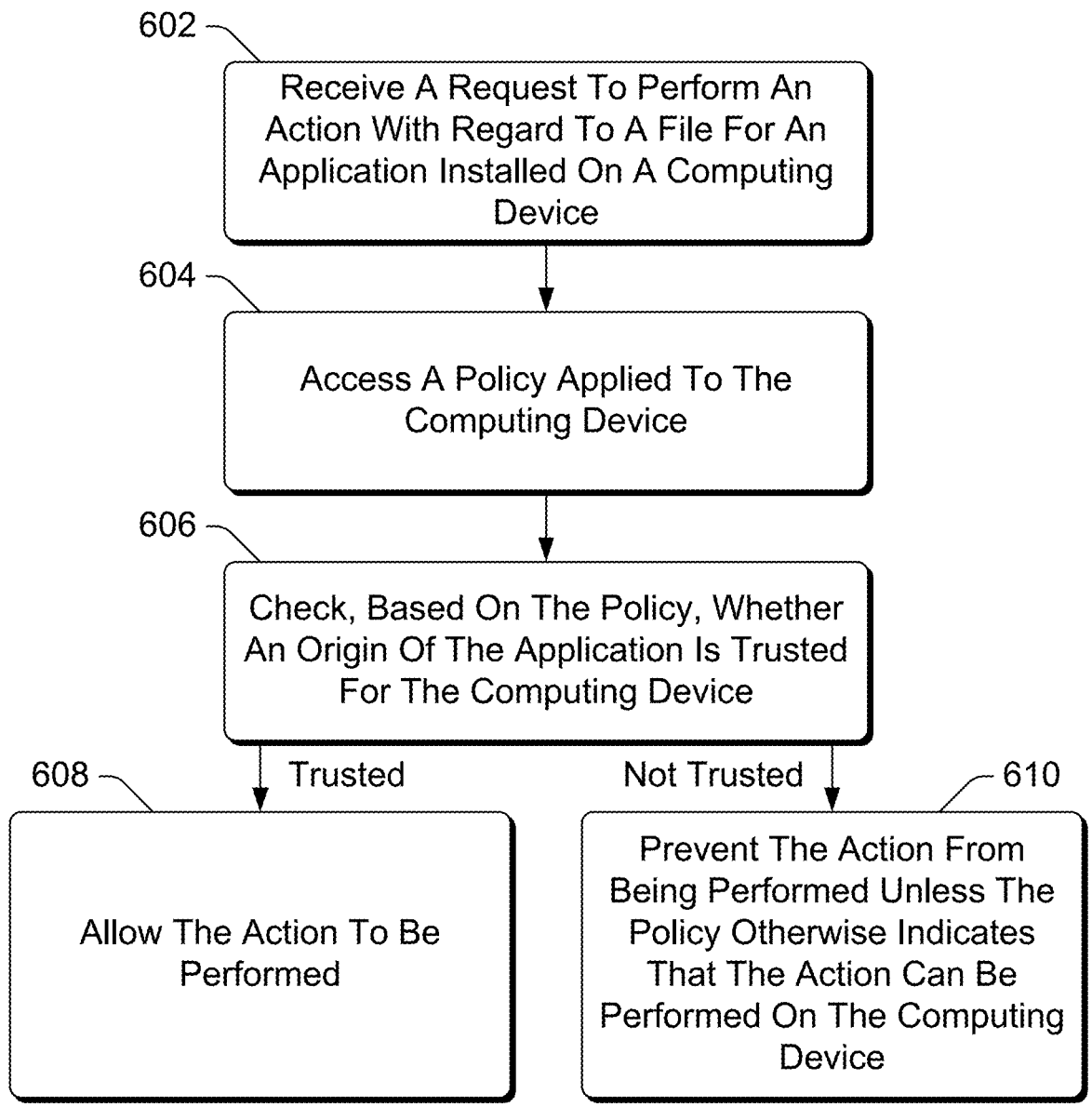
FIG. 6 is a flowchart illustrating an example process for using the origin information for applications propagated during application installation in accordance with one or more embodiments.

FIG. 6 is a flowchart illustrating an example process 600 for using the origin information for applications propagated during application installation in accordance with one or more embodiments. Process 600 is carried out by a computing device, such as computing device 102 of FIG. 1, and can be implemented in software, firmware, hardware, or combinations thereof. Process 600 is shown as a set of acts and is not limited to the order shown for performing the operations of the various acts. Process 600 is an example process for using the origin information for applications propagated during application installation; additional discussions of using the origin information for applications propagated during application installation are included herein with reference to different figures.

In process 600, a request to perform an action with regard to a file for an application installed on a computing device is received (act 602). Various different actions can be requested, such as to run an application (e.g., in situations in which the file is an executable file), to access by the application a resource of the computing device or a resource on a network coupled to the computing device, to log or record information regarding the application, and so forth.

A policy applied to the computing device is accessed (act 604). The policy is received, for example, from an enterprise management service of an enterprise of which the computing device is a part.

A check is made, based on the policy applied to the computing device, whether an origin of the application is trusted for the computing device (act 606). The origin of the application is obtained from, for example, metadata associated with the one or more files. If the origin of the application is listed as a trusted origin in the policy, then the origin of the application is trusted for the computing device and the action is allowed to be performed (act 608).

However, if the origin of the application is not listed as a trusted origin in the policy, then the origin of the application is not trusted for the computing device and the actions is prevented from being performed on the computing device (act 610). The prevention in act 610, however, is a prevention based on the origin of the application. Other claims or rules in the policy can authorize performing of the action, and such authorization overrules the prevention in act 610 so the action can be performed on the computing device.

It should be noted that although two examples of origins of an application package are discussed herein, a managed installer and a reputation checking service, various other origins can also be supported using the techniques discussed herein. These other origins can be various other deployment sources that verify the trustworthiness or appropriateness of a particular application taking an action on a computing device.

Thus, the techniques discussed herein provide for easier management of security on computing devices. An administrator of an enterprise need not specify identifiers of every application that is permitted to run on computing devices in the enterprise, but rather can specify origins that are trusted by the enterprise. An application that is installed from an origin trusted by the enterprise can be run on computing devices in the enterprise. This allows the administrator of the enterprise to quickly and easily specify which applications can be run on computing devices in the enterprise.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
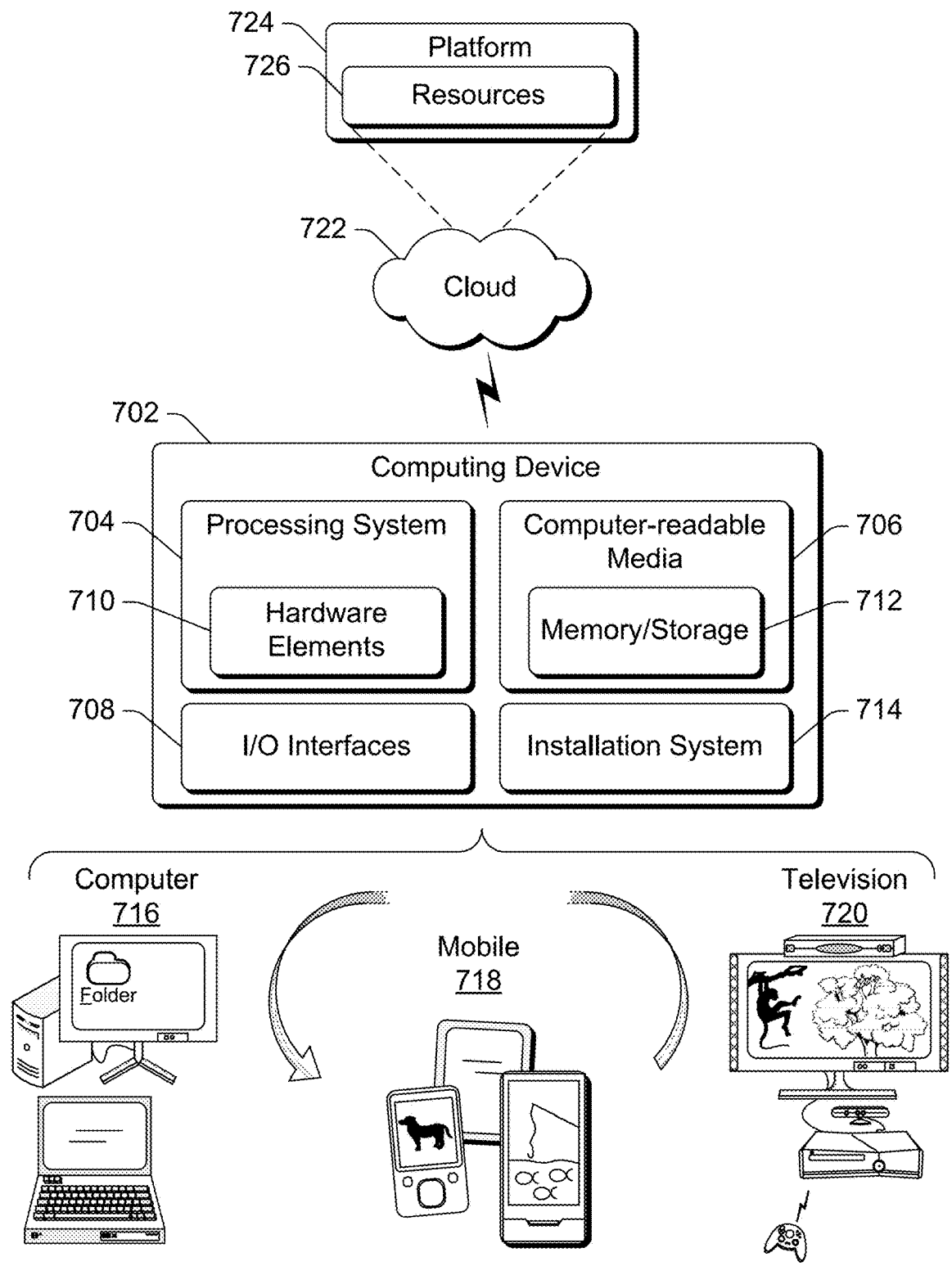
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Resistive RAM (ReRAM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes an installation system 714. The an installation system 714 provides various application installation functionality as discussed above. The an installation system 714 can implement, for example, managed installer module 112 and/or installation module 114 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: receiving a request to install, using an application package, an application on the computing device; identifying an origin of the application package, the origin indicating a deployment source for the application package or a source of trust for the application package; and installing the application on the computing device, the installing including: writing one or more files to a storage device of the computing device; and propagating an indication of the origin of the application package to each of the one or more files.

Alternatively or in addition to any of the above described methods, any one or combination of: the computing device being part of an enterprise and the identifying comprising identifying as the origin of the application package a managed installer for the enterprise; the source of trust for the application package comprising a reputation checking service that verified the application package as being trustworthy, and the identifying comprising identifying as the origin of the application package the reputation checking service that verified the application package as being trustworthy; the propagating an indication of the origin of the application package to each of the one or more files comprising, for each of the one or more files, writing an indication of the origin of the application package to the storage device as metadata associated with the file; the method further comprising receiving a request to perform an action with regard to at least one of the one or more files, checking whether, based on a policy applied to the computing device, the origin propagated to the at least one file is a trusted origin for the computing device, in response to determining that the origin propagated to the at least one file is a trusted origin for the computing device, allowing the action to be performed on the computing device, and in response to determining that the origin propagated to the at least one file is not a trusted origin for the computing device, preventing the action from being performed on the computing device unless the policy otherwise indicates that the action can be performed on the computing device; the computing device being part of an enterprise and the policy being received from an enterprise management service for the enterprise; the at least one file including an executable file for the application, and the action comprising running the application; the action comprising accessing a resource of the computing device or a resource on a network coupled to the computing device; the action comprising logging or recording information regarding the at least one file; the action comprising reading the at least one file and loading the at least one file into memory of the computing device.

A method implemented in a computing device, the method comprising: receiving a request to perform an action with regard to at least one file for an application installed on the computing device; accessing a policy applied to the computing device; checking whether, based on the policy, an origin of the application is trusted for the computing device; in response to determining that the origin of the application is trusted for the computing device, allowing the action to be performed; and in response to determining that the origin of the application is not trusted for the computing device, preventing the action from being performed on the computing device unless the policy otherwise indicates that the application can be performed on the computing device.

Alternatively or in addition to any of the above described methods, any one or combination of: the at least one file including an executable file for the application, and the action comprising running the application; the action comprising the application accessing a resource of the computing device or a resource on a network coupled to the computing device; the action comprising logging or recording information regarding the at least one file; the action comprising reading the at least one file and loading the at least one file into memory of the computing device; the computing device being part of an enterprise and the policy being received from an enterprise management service for the enterprise; an indication of the origin of the program being stored on a storage device of the computing device as metadata associated with the at least one file; the computing device being part of an enterprise and the determining comprising determining that the origin of the program is trusted in response to the origin of the program comprising a managed installer for the enterprise; the determining comprising determining that the origin of the program is trusted in response to the origin of the program comprising a reputation service that verified the application package as trustworthy, the reputation service being identified as a trusted origin in the policy.

A computing device comprising: one or more processors; and a computer-readable storage medium having stored thereon multiple instructions that, responsive to execution by the one or more processors, cause the one or more processors to: receive a request to install, using an application package, an application on the computing device; identify an origin of the application package, the origin indicating a deployment source for the application package or a source of trust for the application package; and install the application on the computing device by writing one or more files to a storage device of the computing device, and propagating an indication of the origin of the application package to each of the one or more files.

A computing device comprising: one or more processors; and a computer-readable storage medium having stored thereon multiple instructions that, responsive to execution by the one or more processors, cause the one or more processors to: receive a request to perform an action with regard to at least one file for an application installed on the computing device; access a policy applied to the computing device; check whether, based on the policy, an origin of the application is trusted for the computing device; in response to determining that the origin of the application is trusted for the computing device, allow the action to be performed; and in response to determining that the origin of the application is not trusted for the computing device, prevent the action from being performed on the computing device unless the policy otherwise indicates that the application can be performed on the computing device.

Alternatively or in addition to any of the above described computing devices, any one or combination of: the at least one file including an executable file for the application, and the action comprising running the application; the action comprising the application accessing a resource of the computing device or a resource on a network coupled to the computing device; the action comprising logging or recording information regarding the at least one file; the action comprising reading the at least one file and loading the at least one file into memory of the computing device; the computing device being part of an enterprise and the policy being received from an enterprise management service for the enterprise; an indication of the origin of the program being stored on a storage device of the computing device as metadata associated with the at least one file; the computing device being part of an enterprise and the determining comprising determining that the origin of the program is trusted in response to the origin of the program comprising a managed installer for the enterprise; the determining comprising determining that the origin of the program is trusted in response to the origin of the program comprising a reputation service that verified the application package as trustworthy, the reputation service being identified as a trusted origin in the policy.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by an application package that is executed on a computing device to install an application thereon, the method comprising:
   obtaining origin information from a process token of the executing application package, the process token having received the origin information from a policy enforcement module that is concurrently executing on the computing device, the origin information indicating one of:
     a deployment source for the application package, or
     a source of trust for the application package;
   writing a file associated with the application to a storage device of the computing device; and
   storing a copy of the origin information as metadata associated with the file.

2. The method as recited in claim 1, the computing device being part of an enterprise and the origin information indicating that the deployment source for the application package comprises a managed installer for the enterprise.

3. The method as recited in claim 1, the origin information indicating that the source of trust for the application package comprises a reputation checking service that verified the application package as being trustworthy.

4. The method as recited in claim 1, wherein the metadata associated with the file is stored in at least one of: alternate data stream extended attributes, a second file separate from the file or a database.

5. The method as recited in claim 1, further comprising:
receiving a request to perform an action with regard to the file;
determining whether, based on a policy applied to the computing device, the origin information associated with the file corresponds to a trusted origin for the computing device;
in response to determining that the origin information associated with the file corresponds to a trusted origin for the computing device, allowing the action to be performed on the computing device; and
in response to determining that the origin information associated with the file does not correspond to a trusted origin for the computing device, preventing the action from being performed on the computing device unless the policy otherwise indicates that the action can be performed on the computing device.

6. The method as recited in claim 5, the computing device being part of an enterprise and the policy being received from an enterprise management service for the enterprise.

7. The method as recited in claim 5, the file including an executable file for the application, and the action comprising running the application.

8. The method as recited in claim 5, the action comprising accessing a resource of the computing device or a resource on a network coupled to the computing device.

9. The method as recited in claim 5, the action comprising logging or recording information regarding the file.

10. The method as recited in claim 5, the action comprising reading the file and loading the file into memory of the computing device.

11. A method implemented in a computing device, the method comprising:
receiving a request to perform an action with regard to a file for an application installed on the computing device;
accessing a policy applied to the computing device;
determining whether, based on the policy, an origin of the application is trusted for the computing device, the origin being based at least in part on an origin claim of a process token of an executing application package used to install the application, the process token having received the origin claim from a policy enforcement module that is concurrently executing on the computing device;
in response to determining that the origin of the application is trusted for the computing device, allowing the action to be performed; and
in response to determining that the origin of the application is not trusted for the computing device, preventing the action from being performed on the computing device unless the policy otherwise indicates that the application can be performed on the computing device.

12. The method as recited in claim 11, the file including an executable file for the application, and the action comprising running the application.

13. The method as recited in claim 11, the action comprising the application accessing a resource of the computing device or a resource on a network coupled to the computing device.

14. The method as recited in claim 11, the action comprising logging or recording information regarding the file.

15. The method as recited in claim 11, the action comprising reading the file and loading the file into memory of the computing device.

16. The method as recited in claim 11, the computing device being part of an enterprise and the policy being received from an enterprise management service for the enterprise.

17. The method as recited in claim 11, an indication of the origin of the application being stored on a storage device of the computing device as metadata associated with the file.

18. The method as recited in claim 11, the computing device being part of an enterprise and the determining comprising determining that the origin of the application is trusted where the origin of the application comprises a managed installer for the enterprise.

19. The method as recited in claim 11, the determining comprising determining that the origin of the application is trusted where the origin of the application indicates that a reputation service verified the application package as trustworthy, the reputation service being identified as a trusted origin in the policy.

20. A computing device comprising:
one or more processors; and
a computer-readable storage medium having stored thereon multiple instructions that, responsive to execution of an application package by the one or more processors to install an application on the computing device, cause the one or more processors to:
obtain origin information from a process token of the executing application package, the process token having received the origin information from a policy enforcement module that is concurrently executing on the computing device, the origin information indicating one of:
a deployment source for the application package, or
a source of trust for the application package;
write a file associated with the application to a storage device of the computing device; and
store a copy of the origin information as metadata associated with the file.

* * * * *